United States Patent [19]

Kakogawa et al.

[11] 4,258,161

[45] Mar. 24, 1981

[54] PROCESS FOR POLYMERIZING PROPYLENE

[75] Inventors: Genjiro Kakogawa; Masayoshi Hasuo; Yoshinori Suga, all of Yokohama; Hisashi Kitada, Tokyo; Yumito Uehara, Kawasaki, all of Japan

[73] Assignee: Mitsubishi Chemical Industries Ltd., Tokyo, Japan

[21] Appl. No.: 5,471

[22] Filed: Jan. 22, 1979

[30] Foreign Application Priority Data

Feb. 14, 1978 [JP] Japan ................................. 53-15758
Sep. 12, 1978 [JP] Japan ................................ 53-111865

[51] Int. Cl.³ .......................... C08F 4/66; C08F 10/06
[52] U.S. Cl. ................................. 526/153; 252/429 B; 526/119; 526/139; 526/140; 526/141; 526/142; 526/158; 526/159; 526/351
[58] Field of Search ............... 526/139, 140, 141, 142, 526/159, 153, 158

[56] References Cited

U.S. PATENT DOCUMENTS

| | | | |
|---|---|---|---|
| 2,971,950 | 2/1961 | Natta et al. ........................... | 526/137 |
| 3,197,452 | 7/1965 | Natta et al. ........................... | 526/159 |
| 4,060,593 | 11/1977 | Kazuo et al. ......................... | 526/142 |
| 4,123,387 | 10/1978 | Shiga et al. .......................... | 526/142 |
| 4,127,504 | 11/1978 | Ueno et al. ........................... | 526/142 |
| 4,127,505 | 11/1978 | Ueno et al. ........................... | 526/142 |
| 4,136,243 | 1/1979 | Appleyard et al. .................. | 526/142 |
| 4,151,112 | 4/1979 | Wristers ................................ | 526/142 |

FOREIGN PATENT DOCUMENTS

| | | | |
|---|---|---|---|
| 997462 | 7/1965 | United Kingdom .................... | 526/140 |
| 1128724 | 10/1968 | United Kingdom .................... | 526/142 |
| 1391067 | 4/1975 | United Kingdom .................... | 526/142 |

*Primary Examiner*—Edward J. Smith
*Attorney, Agent, or Firm*—Oblon, Fisher, Spivak, McClelland & Maier

[57] ABSTRACT

Propylene is polymerized in the presence of a catalytic system of the type which comprises a solid titanium trichloride-based complex serving as a catalyst, said complex having an atomic ratio of aluminum to titanium in the range of below 0.15:1 and containing a complexing agent, and an organic aluminium compound of the general formula, $AlR_n^1Cl_{3-n}$ wherein $R^1$ represents an n-propyl group or an n-hexyl group and n is a value of 1.95–2.10. The catalytic system may further comprise an electron-donor compound as a third catalytic component.

12 Claims, No Drawings

PROCESS FOR POLYMERIZING PROPYLENE

This invention relates to a process for polymerizing propylene. More particularly, it relates to a process for polymerizing propylene by the use of a catalytic system composed of a highly active, solid titanium trichloride-based catalytic complex and a specific organic aluminium compound.

It is well known to use a solid titanium trichloride-based catalytic complex as a catalyst and an organic aluminium compound as a cocatalyst for the stereospecific polymerization of propylene. It is also known that the organic aluminum compound gives different influences on activity for polymerization and stereospecificity depending on the type thereof. In known processes of polymerizing propylene using an organic aluminium compound as a cocatalyst, however, a cocatalyst represented, for example, by the general formula, $AlR_2X$ (in which R represents an alkyl group and X represents a halogen atom) contributes to impart high stereospecificity but is low in polymerization activity, so that the amount of polymer formed per unit amount of catalyst (hereinafter referred to as catalytic efficiency) is low, thus requiring an additional step of removing the catalyst from the polymer product. On the other hand, a cocatalyst represented by the general formula, $AlR_3$ (in which R represents an alkyl group) gives high polymerization activity and is thus high in catalytic efficiency. However, the cocatalyst of this type results in a polymer of very low stereospecificity, requiring a step of removing amorphous polymer from the polymer product. Thus, both types of the aluminium compounds are disadvantageous.

In order to improve the polymerization activity, when an organic aluminium compound expressed by the general formula, $AlR_2X$, particularly, diethylaluminium monochloride now widely used industrially, is used as a cocatalyst, it is known to add to the above organic aluminium compound small amount of a compound expressed by the general formula, $AlR_3$, e.g. triethylaluminium, triisobutylaluminium or the like in such a manner that the ratio of R to Al is in the range of above 2:1. In this case, though the polymerization activity is improved as will be clearly seen from Comparative Examples shown hereinafter, the stereospecificity is lowered to a considerable extent. Thus, this catalytic system is considered disadvantageous as an industrial catalyst in view of its poor practicability. From the above, it has been revealed that when diethylaluminium monochloride is used as a cocatalyst, its purity is an important factor for retaining the stereospecificity advantageously developed from the monochloride compound. In other words, it has been found that it is important to keep the ratio of an ethyl group to Al at 2:1.

We have made an intensive study of a cocatalyst expressed by the general formula, $AlR_2X$. As a result, it has been found that a catalytic system using a compound expressed by the general formula, $AlR_nCl_{3-n}$ with the R and n being specifically defined is high in polymerization activity and ensures high stereospecificity.

According to the present invention, a process is provided for polymerizing propylene in which propylene is polymerized in the presence of a solid titanium trichloride-based complex, as a catalyst, having such an aluminium content that the atomic ratio of aluminium to titanium is in the range of below 0.15:1 and containing a complexing agent and an organic aluminium compound as a cocatalyst, characterized in that said organic aluminium compound is one expressed by the general formula $AlR_n^1Cl_{3-n}$ (in which $R^1$ represents a normal propyl group or a normal hexyl group, and n is a value of 1.95–2.10).

The present invention will be described in detail.

The solid titanium trichloride-based complex used as a catalyst in the practice of the invention has an aluminium content such that the atomic ratio of aluminium to titanium is in the range of below 0.15:1, preferably below 0.1:1 and most preferably below 0.02:1, and contains a complexing agent. The content of the complexing agent is such that the molar ratio of the complexing agent to the titanium trichloride contained in the solid titanium trichloride-based catalytic complex is in the range of above 0.001:1, preferably above 0.01:1.

In particular, the catalytic complex is one which is expressed, for example, by the formula, $TiCl_3 \cdot (AlR_p^3X_{3-p})_x \cdot (C)_y$ (in which $R^3$ represents a hydrocarbon group having 1–20 carbon atoms, X represents a halogen atom, p is a value of $0 \leq p \leq 2$, C represents a complexing agent, x is a value of below 0.15, and y is a value of above 0.001). As a matter of course, the catalytic complex may contain, aside from the $TiCl_3$ component, $AlR_p^3X_{3-p}$ component a and complexing agent C component, small amount of iodine, a compound obtained by substituting part or all of the chlorine of the titanium trichloride with iodine or bromine, an inert inorganic solid such as of $MgCl_2$, $MgO$ or the like, or a powdered olefin polymer such as powdered polyethylene, polypropylene or the like. Examples of the complexing agent C include ethers, thioethers, ketones, carboxylic acid esters, amines, carboxylic acid amides, polysiloxanes and the like. Of these, the ethers or thioethers are most preferable. Ethers or thioethers are those which are expressed by the general formula, $R^4$-O-$R^5$ or $R^4$-S-$R^5$ (in which $R^4$ and $R^5$ independently represent a hydrocarbon group having below 15 carbon atoms). Specific examples of the ethers or thioethers will be mentioned hereinafter. $AlR_p^3X_{3-p}$ is, for example, $AlCl_3$ or $AlR^3Cl_2$.

The solid titanium trichloride-based catalytic complex useful in the process of the invention is most preferably one which has an X-ray diffraction chart such that its halo of maximum intensity is located at a position corresponding to the maximum peak position of $\alpha$-titanium trichloride (i.e. in the vicinity of $2\theta = 32.9°$). The solid titanium trichloride-based catalytic complex is preferred not to undergo a heat history exceeding 150° C. during the preparation of the complex.

The catalytic complex can be readily prepared by any of several methods including:

(a) A method of precipitating the complex at a temperature below 150° C. from a liquid medium containing titanium trichloride and an ether or a thioether; and
(b) A method of treating solid titanium trichloride obtained by reducing titanium tetrachloride with an organic aluminium compound or metallic aluminium with a complexing agent and then a halogen compound.

The method (a) has been already described in Japanese Patent Application Nos. 49-88476, 49-88477, 49-120100, 50-1154, 50-16722, 50-19552, 52-140922 and 52-147590. Particularly stating, a liquid medium containing titanium trichloride and an ether or a thioether can be obtained by either of the following two methods:
(A) A method in which titanium tetrachloride is provided as a starting material and is reduced with an organic aluminium compound in an ether or a thioether and, if necessary, in a suitable hydrocarbon solvent; and (B) A method in which solid titanium trichloride is provided as a starting material and is treated with an ether or a thioether, if necessary, in a suitable hydrocarbon solvent.

The ethers and thioethers useful for the above purpose are those which are defined by the foregoing general formulae in which $R^4$ and $R^5$ independently represent an alkyl group, preferably a linear alkyl group, such as ethyl, n-propyl, n-butyl, n-amyl, n-hexyl, n-heptyl, n-octyl, n-decyl, n-dodecyl or the like; an alkenyl group, preferably a linear alkenyl group, such as butenyl, octenyl or the like; an aryl group such as tolyl, xylyl, ethylphenyl or the like; and an aralkyl group such as benzyl. Preferably, dialkyl ethers, dialkenyl ethers, alkyl alkenyl ethers, dialkyl thioethers are used.

Suitable hydrocarbon solvents are saturated aliphatic hydrocarbons such as n-pentane, n-hexane, n-heptane, n-octane, n-dodecane, liquid paraffin and the like, alicyclic hydrocarbons such as cyclohexane, methylcyclohexane and the like, and aromatic hydrocarbons such as benzene, toluene, xylene and the like. The choice of the hydrocarbon solvent depends on the type of ether or thioether. For instance, when an ether or thioether of the foregoing general formula in which at least one of $R^4$ and $R^5$ is an alkyl group or alkenyl group having 3-5 carbon atoms is used, an aromatic hydrocarbon is preferably selected and, after the aromatic hydrocarbon, an alicyclic hydrocarbon is used. If an ether of the formula in which $R^4$ and $R^5$ are individually an alkyl group or alkenyl group having six or more carbon atoms is employed, a saturated aliphatic hydrocarbon is preferably used.

Examples of the organic aluminium compound useful in the method (A) are compounds expressed by the general formula $AlR_q^6X_{3-q}$ (in which $R^6$ represents a hydrocarbon group having 1-20 carbon atoms, q represents a value of 1-3, and X represents a halogen atom).

The aluminium compound is used in such an amount that the molar ratio of titanium contained in the titanium tetrachloride to the hydrocarbon group of the organic aluminium compound (i.e. $R^6$ of the general formula) is in the range of 1:0.1-1:50, preferably 1:0.3-1:10.

The ether or thioether is used in such an amount that the molar ratio of ether: titanium tetrachloride is in the range of 1:0.05-1:5, preferably 1:0.25-1:2.5.

The reduction reaction may be conducted by any arbitrary method and is normally effected by contacting the three components successively in an arbitrary order at a temperature of 0°-50° C. to give a liquid medium. It will be noted that addition of iodine, titanium tetraiodide or titanium tetrabromide to the starting titanium tetrachloride in a small amount, e.g. in a molar ratio to the titanium tetrachloride of about 0.005-0.3:1, is desired since the resulting solid titanium trichloride-based catalytic complex becomes very active and can produce a polymer of high stereospecificity.

As the starting solid titanium trichloride in method (B), a compound may be used which is prepared by reducing titanium tetrachloride with hydrogen gas or aluminium. Preferably, titanium trichloride is used which is obtained by reducing titanium tetrachloride with an organic aluminium compound. The amount of the ether or thioether is such that the molar ratio of titanium trichloride to ether or thioether is in the range of above 1:1, preferably 1:1-5. The treatment with ether or thioether is generally conducted at 0°-100° C., preferably 20°-50° C.

In the method (a), the fine particulate solid titanium trichloride-based catalytic complex is precipitated at a temperature below 150° C. from the liquid medium prepared by the above method (A) or (B). Any convenient precipitation technique can be employed and the present invention is not limited to any particular methods. The liquid medium may be heated as it is or after being diluted with a hydrocarbon diluent, if necessary, to a temperature of below 150° C., generally 20°-150° C., preferably 40°-120° C. and most preferably 60°-100° C., thereby permitting the precipitation. It will be noted that when the total molar amount of the titanium and aluminium contained in the titanium trichloride liquid medium is smaller than the moles of the ether or thioether, a liberating agent may be added to expedite the precipitation.

The liberating agent should have capability of precipitating free solid titanium trichloride by reaction with the complex of the titanium trichloride and the ether or thioether, and includes Lewis acids which are more acidic than titanium trichloride, such as, for example, titanium tetrachloride, boron trifluoride, vanadium tetrachloride, aluminium trichloride, alkylaluminium dihalide, alkylaluminium sesquihalide, dialkylaluminium halide and the like. Of these, titanium tetrachloride and aluminium halides such as aluminium trihalides, alkylaluminium dihalides, etc. are preferable. The amount of the liberating agent is preferred to be less than 5 times the molar amount of the titanium in the liquid medium.

The method (b) has been described in Japanese Laid-open Patent Publication Nos. 47-34478 and 48-64170 and Japanese Patent Application Nos. 49-11720 and 49-29622. More particularly, titanium tetrachloride is first reduced with an organic aluminium compound or metallic aluminium. The organic aluminium compounds of the general formula illustrated in the method (a)-(A) are similarly used in this case. The reduction reaction is feasible by any known technique. For example, in reduction using in organic aluminium compound, the organic aluminium compound is added, in a diluent, to titanium tetrachloride in an amount in excess of 1 times by mole, preferably 1-10 times by mole, that of the titanium tetrachloride at a temperature of approximately −50° C.-30° C. and the mixture is heated to a temperature of −10°-100° C. to complete the reaction. Where metallic aluminium is used for the reduction, it will suffice that 0.1-1 gram atom of metallic aluminium per mole of titanium tetrachloride is added to titanium tetrachloride together with a small amount of $AlCl_3$ in a diluent such as xylene or in the absence of the diluent and the mixture is heated to 80°-300° C., preferably 100°-200° C.

In the method (b), the thus obtained solid titanium trichloride is then treated with a complexing agent and a halogen compound. As the complexing agent, there may be likewise used the compounds which have been exemplified hereinbefore as the complexing agent C. Titanium tetrachloride or carbon tetrachloride can be used as the halogen compound. Though simultaneous treatments with the complexing agent and the halogen compound may be feasible, it is possible to first conduct the treatment with the complexing agent and then the treatment with the halogen compound. The treatment with complexing agent is generally effected at a temperature of −20°-80° C. by adding a complexing agent to solid titanium trichloride in a diluent in an amount of 0.2–3 times by mole that of TiCl₃. The solid obtained after the treatment with complexing agent is preferably separated and washed. The treatment with halogen compound is generally conducted in a diluent at a temperature of $-10°$–$50°$ C. The amount of the halogen compound is in the range of 0.1–10 times by mole, preferably 1–5 times by mole, that of TiCl₃. After the treatment with halogen compound, the obtained solid is preferably to be separated and washed.

Though it is preferred to prepare the solid titanium trichloride-based catalytic complex according to method (a) or (b), a catalytic complex may be used as prepared, without resorting to the method (a) or (b), by a method described in Japanese Laid-open Patent Publication No. 51-123796. In this method, an ether compound is added to solid titanium trichloride, obtained by reducing titanium tetrachloride with an organic aluminium compound, in an amount by molar ratio to the titanium trichloride of 0.5–5:1, heating the mixture to $50°$–$120°$ C., and separating the resulting solid from the system to obtain the catalytic complex.

In accordance with the process of the invention, the thus obtained solid titanium trichloride-based catalytic complex is used as the catalyst. It will be noted that pure titanium trichloride (TiCl₃) obtained by hydrogen reduction of titanium tetrachloride, titanium trichloride-aluminium trichloride cocrystals (TiCl₃·⅓AlCl₃) obtained by aluminium reduction of titanium tetrachloride and mechanically ground products of similar types of titanium trichloride, as they are, do not yield the remarkable effects exhibited by the present invention and thus are not suitable for use as the catalyst in the process of the invention.

In the practice of the invention, a compound represented by the general formula, $AlR_n^1Cl_{3-n}$ (in which $R^1$ represents a n-propyl group or a n-hexyl group, and n is a value of 1.95–2.10) as described hereinabove is used as the cocatalyst. It is important to note that, in the above general formula, $1.95 \leq n \leq 2.10$, and within this range the compound can produce good results with respect to polymerization activity and stereospecificity of the polymer when the polymerization is conducted in combination with the above-described solid titanium trichloride-based catalytic complex. These results can not be obtained if $R^1$ is neither n-propyl group nor n-hexyl group, which will be clearly seen from Comparative Examples appearing hereinafter. When a compound of the above formula in which $n > 2.10$ is used, the stereospecificity is lowered to a greater extent as compared with an increase of polymerization activity. On the contrary, when a compound of the formula in which $n < 1.95$ is used, the extent of decrease in polymerization activity becomes much greater than the increase the stereospecificity. In either case, unfavorable results develop. The organic aluminium compounds which serve as a cocatalyst include those having both the n-propyl group and n-hexyl group as $R^1$ of the above-indicated general formula.

The organic aluminium compound cocatalyst can be prepared by any known method, e.g. by reacting tri-n-propylaluminium or tri-n-hexylaluminium with aluminium trichloride or by reacting (a) tri-n-propylaluminium, tri-n-hexylaluminium or aluminium trichloride with (b) a compound represented by the general formula, $AlR_m^2Cl_{3-m}$ (in which $R^2$ represents a n-propyl group or a n-hexyl group, and m is a value of $0 < m < 3$). Further, the organic aluminium compound may be prepared by a combination of the above-described two methods, i.e. by reacting tri-n-propylaluminium or tri-n-hexylaluminium with aluminium trichloride to give a $AlR_m^2Cl_{3-m}$ compound in which m is approximately in the range of 0.9–2.1 and adding small amount of tri-n-propylaluminium, tri-n-hexylaluminium or aluminium trichloride for reaction with the above compound so that a predetermined value of n is obtained.

In the above case, the reaction temperature is in the range of from temperature to $150°$ C., preferably $50°$–$100°$ C. and the reaction time is in the range of several minutes—several hours, preferably 1–2 hours. Though the reaction is feasible without use of any solvent, it may be conducted in a solvent of an aliphatic hydrocarbon such as n-hexane, n-heptane or the like, an aromatic hydrocarbon such as toluene, xylene or the like, or an alicyclic hydrocarbon such as cyclohexane, methylcyclohexane or the like. When a trialkylaluminium having an alkyl group different from the $R^2$ group of $AlR_m^2Cl_{3-m}$ is used as a reactant to be added in the second reaction step of the combination method, a compound can be obtained which has both the n-hexyl group and the n-propyl group therein.

In accordance with the process of the present invention, an electron-donor compound may be used as a third catalytic component in addition to the above-described catalyst and cocatalyst whereby the produced polymer is improved in stereospecificity without reduction of the polymerization activity. The electron-donor compounds useful for the above purpose are those which contain one or more electron-donor atoms or groups and include, for example, ethers polyethers, alkylene oxides, furan, amines trialkylphosphines triarylphosphines, pyridine, quinoline, phosphoric acid esters, phosphoric acid amides, phosphine oxides, trialkylphosphites, triarylphosphites, ketones, carboxylic acid esters, carboxylic acid amides and the like. Of these, carboxylic acid esters such as ethyl benzoate, methyl benzoate, phenyl acetate, etc.; glycine esters such as dimethylglycine ethyl ester, dimethylglycine phenyl ester, etc.; and triaryl phosphites such as triphenyl phosphite, trinonylphenyl phosphite, etc. are preferably used.

The ratio of the catalytic components is as follows: the mole ratio of titanium trichloride contained in the solid titanium trichloride-based catalytic complex to an organic aluminium compound is in the range of 1:1–100, preferably 1:2–40. When the above-described third catalytic component is used, the mole ratio of the titanium trichloride to the third catalytic component is in the range of 1:0.01–10, preferably 1:0.05–2.

Further, aromatic hydrocarbons such as benzene, toluene and xylene are usable as the third catalytic component.

In accordance with the present invention, propylene can be homopolymerized, random copolymerized with other α-olefins in the presence of the catalytic system substantially composed of the solid titanium trichloride-based catalytic complex, the organic aluminium compound and, if necessary, the third catalytic component. Further, propylene and the other α-olefin can be block copolymerized to the above random copolymer and the above homopolymer or random copolymer, respectively. In addition, after the block copolymerization, propylene may be further polymerized. Examples of other α-olefins include ethylene, butene-1, 3-methylbutene-1, 4-methylpentene-1, pentene-1, hexene-1, and the like. The process of the invention is particularly suitable for stereospecific polymerization to produce a propylene homopolymer, a random copolymer containing 90 wt % or more of propylene, a block copolymer containing 80 wt % or more of propylene.

The polymerization reaction may be conducted either by vapor phase polymerization or by slurry polymerization using a solvent. Examples of solvents include aliphatic hydrocarbons such as pentane, heptane, hexane, decane, etc.; alicyclic hydrocarbons such as cyclohexane, methylcyclohexane, etc., and aromatic hydrocarbons such as benzene, toluene, etc. In addition, the above-mentioned olefins per se including propylene may be also used as the solvent.

The polymerization reaction is feasible by a batch or continuous manner. Though the polymerization temperature and pressure are not critical, the temperature is generally in the range of 50°-100° C., preferably 60°-90° C. and the pressure is in the range of atmospheric pressure to about 100 atms.

On polymerization, a known molecular weight controlling agent such as hydrogen, a halogenated hydrocarbon or the like may be employed to control the molecular weight of the produced polymer. The solid titanium trichloride-based complex used as the catalyst may be applied for polymerization as it is, but it is preferably pretreated with small amount of the aforeindicated olefin in the presence of the organic aluminium compound. This pretreatment is effective for improving the physical properties of the polymer slurry such as bulk density.

The pretreatment is conducted at a temperature lower than the polymerization temperature, normally at 20°-60° C. in order that the weight ratio of the polymer produced by the pretreatment to the titanium trichloride in the catalytic complex=0.1-50/1 preferably 1-20/1.

The polymerization of propylene is effected in a manner as described hereinbefore. The effects of the high polymerization activity and high stereospecificity attained by the process of the invention become more pronounced especially when the polymerization is conducted at high catalytic efficiency so that a polymer is produced in an amount of, for example, 5,000 grams or more, preferably 10,000 grams or more, per gram of titanium trichloride (TiCl$_3$) in the solid catalytic complex. By this, the amount of the catalyst remaining in the polymer will decrease at a higher level and the polymer is improved in stereospecificity. Thus, a polymerization which ensures such high catalytic efficiency is especially favorable.

According to the process of the invention for polymerizing propylene as described in detail hereinabove, good effects and results concerning the polymerization activity and the stereospecificity of polymer (isotactic index) have been obtained to an extent not experienced in prior art processes. Thus, the present invention is believed to have a great merit from an industrial standpoint.

The present invention will be particularly illustrated by way of Examples and Comparative Examples. In the Examples and Comparative Examples, the catalytic efficiency, C.E., means the amount by gram of produced polypropylene per gram of titanium trichloride in the solid catalytic complex, and the polymerization activity K means the amount by gram of produced polypropylene per hour, kg/cm$^2$ of propylene pressure and gram of the titanium trichloride. The isotactic index, I.I. (%), means the amount of residue (wt %) remaining when a polymer is extracted with boiling n-heptane in the modified Soxhlet extracter for 6 hours. Since the amorphous polymer is soluble in boiling n-heptane, the index, I.I. (%), shows the yield of crystalline polymer.

The melt flow index, M.F.I., of polymer was measured according to the method prescribed in ASTM-D 1238 and the bulk density, $\pi_B$, of polymer was measured by the method prescribed in JIS-K-6721.

Cocatalyst-preparatory Example 1 [Synthesis of Al(n-C$_3$H$_7$)$_n$Cl$_{3-n}$]

120 m moles of purified AlCl$_3$ and 170 ml of purified toluene were charged into a 500 ml three necked flask which had been dried and flushed with nitrogen. Then, 210 m moles of tri-n-propylaluminium, Al(n-C$_3$H$_7$)$_3$, was gradually added to the slurry at room temperature while agitating. After agitation for 30 minutes at room temperature, the reaction system was heated up to 90° C. and was continuedly agitated for 4 hours at the temperature. The AlCl$_3$ solid began to disappear during the heating and a colorless, uniform solution was obtained on completion of the reaction. The analysis of Al and Cl in the resulting organic aluminium compound dissolved in the toluene revealed that the aluminium compound had a composition of Al(n-C$_3$H$_7$)$_{1.91}$Cl$_{1.09}$.

The solution was divided into predetermined portions and each portion was placed in a 100 ml three necked flask which was dried and flushed with nitrogen, followed by adding tri-n-propylaluminium, Al(n-C$_3$H$_7$)$_3$ so that a predetermined n-C$_3$H$_7$/Al ratio was attained and agitation of the solution at 80° C. for 2 hours. After completion of the reaction, a colorless, uniform solution was obtained. The reaction conditions are shown in Table 1.

Cocatalyst-preparatory Example 2 [Synthesis of Al(n-C$_6$H$_{13}$)$_n$Cl$_{3-n}$]

Into a 500 ml three necked flask which had been dried and flushed with nitrogen were charged 120 m moles of purified AlCl$_3$ and 164 ml of purified toluene. While agitating the slurry, 207 m moles of tri-n-hexylaluminium, Al(n-C$_6$H$_{13}$)$_3$, was gradually added to the slurry at room temperature. After agitation for 30 minutes at room temperature, the reaction system was heated up to 90° C. and was continuedly agitated for an additional 2 hours at the temperature. Upon heating, the AlCl$_3$ solid began to disappear and a colorless, uniform solution was obtained on completion of the reaction.

The analysis for Al and Cl of an organic aluminium compound dissolved in the toluene revealed that the compound had a composition of Al(n-C$_6$H$_{13}$)$_{1.90}$Cl$_{1.10}$.

The solution was divided into predetermined portions and each portion was placed in a 100 ml three necked flask which had been dried and flushed with nitrogen, followed by addition of tri-n-hexylaluminium, Al(n-C$_6$H$_{13}$)$_3$, so that a predetermined n-C$_6$H$_{13}$/Al ratio was attained and agitation at 80° C. for 2 hours. After completion of the reaction, a colorless, uniform solution was obtained. The reaction conditions are shown in Table 2.

TABLE 1

| Starting Material | | | |
|---|---|---|---|
| Al(n-C$_3$H$_7$)$_{1.91}$Cl$_{1.09}$ m mole | Al(n-C$_3$H$_7$)$_3$ m mole | Reaction °C. - hrs. | n in Al(n-C$_3$H$_7$)$_n$Cl$_{3-n}$ |
| 30.0 | 1.14 | 80 - 2 | 1.95 |
| " | 3.71 | " | 2.03 |

TABLE 1-continued

| Starting Material | | | |
|---|---|---|---|
| Al(n-C$_3$H$_7$)$_{1.91}$Cl$_{1.09}$ m mole | Al(n-C$_3$H$_7$)$_3$ m mole | Reaction °C. - hrs. | n in Al(n-C$_3$H$_7$)$_n$Cl$_{3-n}$ |
| " | 4.42 | " | 2.05 |
| " | 6.33 | " | 2.10 |
| " | 2.70 | " | 2.00 |
| " | 8.47 | " | 2.15 |

TABLE 2

| Starting Material | | Reaction | |
|---|---|---|---|
| Al(n-C$_6$H$_{13}$)$_{1.90}$Cl$_{1.10}$ m mole | Al(n-C$_6$H$_{13}$)$_3$ m mole | °C. - hrs. | n in Al(n-C$_6$H$_{13}$)$_n$Cl$_{3-n}$ |
| 20.0 | 0.95 | 80 - 2 | 1.95 |
| " | 3.16 | " | 2.05 |
| " | 2.00 | " | 2.00 |
| " | 5.88 | " | 2.15 |

Cocatalyst-Preparatory Example 3 [Synthesis of Al(C$_2$H$_5$)$_n$Cl$_{3-n}$]

Into a 100 ml three necked flask which had been dried and flushed with nitrogen was charged with 20 ml of a purified toluene solution containing 20.0 m moles of Al(C$_2$H$_5$)$_{1.5}$Cl$_{1.5}$.

To the solution was gradually added a purified toluene solution containing Al(C$_2$H$_5$)$_3$ in different amounts indicated in Table 3 at room temperature while agitating the solution. The mixture was continuously agitated at room temperature for an additional 30 minutes and then at 90° C. for 4 hours. The reaction conditions are shown in Table 3.

TABLE 3

| Starting Material | | | |
|---|---|---|---|
| Al(C$_2$H$_5$)$_{1.5}$Cl$_{1.5}$ m mole | Al(C$_2$H$_5$)$_3$ m mole | Reaction °C. - hrs. | n in Al(C$_2$H$_5$)$_n$Cl$_{3-n}$ |
| 20.0 | 8.57 | 90 - 4 | 1.95 |
| " | 11.58 | " | 2.05 |
| " | 13.33 | " | 2.10 |
| " | 10.00 | " | 2.00 |

Catalyst-preparatory Example 1 (Preparation of solid titanium trichloride-based catalytic complex)

(A) Preparation of homogeneous titanium trichloride solution

Into a 500 ml four necked flask which had been dried and flushed with dry argon were charged 150 ml of purified toluene and 90 m moles of titanium tetrachloride, followed by 77 m moles of di-n-butyl ether. The titanium tetrachloride and the di-n-butyl ether were reacted with each other with the attendant slight generation of heat, and dissolved uniformly in the toluene to give an orange yellow uniform solution. To the solution was gradually added a solution of 45 m moles of diethylaluminium monochloride in 20 ml of toluene while maintaining the solution at 25° C. under agitation thereby obtaining a dark orange homogeneous solution of titanium trichloride.

(B) Precipitation of titanium trichloride and preparation of catalyst

When the homogeneous solution of titanium trichloride obtained in the above step (A) was heated up to 95° C., it was recognized that purple titanium trichloride precipitated upon heating.

After being agitated at 95° C. for 30 minutes, the precipitate was separated by filtration and washed once with 100 ml of toluene and five times with 100 ml of n-heptane to obtain a fine particulate purple titanium trichloride-based catalytic complex. As a result of the elementary analysis, it was found that the catalytic complex had a composition of the formula

TiCl$_3$(AlCl$_3$)$_{0.004}$[(n-C$_4$H$_9$)$_2$O]$_{0.06}$

When the X-ray diffraction spectra of the catalytic complex were measured with use of a CuKα ray, it was found that a halo of a maximum intensity appeared at 2θ=32.9°. Catalyst-preparatory Example 2 (Preparation of solid titanium trichloride-based catalytic complex)

Into a 500 ml four necked flask which had been sufficiently dried and flushed with dry argon were charged 120 ml of n-heptane and 100 m moles of titanium tetrachloride, followed by 93 m moles of di-n-octyl ether. Then, a solution of 33 m moles of diethylaluminium monochloride in 50 ml of n-heptane was gradually added to the solution while agitating at 25° C., thereby obtaining a greenish dark brown homogeneous solution of titanium trichloride in n-heptane.

(B) Formation of precipitate of titanium trichloride and preparation of catalyst The homogeneous titanium trichloride solution obtained in the above step (A) was heated up to 95° C., during which time a purple titanium trichloride precipitate was formed.

After being agitated at 95° C. for 30 minutes, the precipitate was separated by filtration and washed with 100 ml of n-heptane five times to obtain a fine particulate, purple, solid titanium trichloride-based catalytic complex. As a result of the elementary analysis, it was found that the catalytic complex had a composition of the formula:

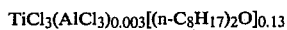
TiCl$_3$(AlCl$_3$)$_{0.003}$[(n-C$_8$H$_{17}$)$_2$O]$_{0.13}$

When the X-ray diffraction spectra of the complex were measured by the use of a CuKα ray, it had a halo of a maximum intensity at 2θ=32.9°.

Catalyst-preparatory Example 3 (Preparation of solid titanium trichloride-based catalytic complex)

(A) Preparation of reduced solid material 45 ml of n-hexane and 100 m moles of titanium tetrachloride were charged into a 500 ml four necked flask whose atmosphere had been replaced by argon and cooled to 0° C., and into which was dropped a solution composed of 70 ml of n-hexane and 200 m moles of ethylaluminium sesquichloride over 30 minutes under agitation. After addition of the reagents, the agitation was continued for aging at 0° C. for a further 2 hours, followed by washing with 100 ml of n-hexane five times to obtain 21 g of a reddish purple solid substance.

(B) Treatment with complexing agent 150 ml of n-hexane and 21 ml of diisoamyl ether were added to the reddish purple solid substance obtained in above step (A) for reaction at 30° C. for 1 hour under agitation. Then, the solid substance was washed with 100 ml of n-hexane five times and dried under reduced pressure to obtain 21 g of a brown substance.

(C) Treatment with titanium tetrachloride 400 m moles of titanium tetrachloride was added to the brown substance obtained in the above step (B). After reaction at 35° C. for 1.5 hours, the resulting reaction product was washed with 100 ml of n-hexane eight times to obtain about 20 g of a purple solid titanium trichloride-based catalytic complex. As a result of the elementary analysis, the complex was found to have a composition of the formula, $TiCl_3\cdot(AlCl_3)_{0.01}[(i-C_5H_{11})_2O]_{0.11}$. When the X-ray diffraction spectra of the complex were measured using a CuKα ray, a halo of a maximum intensity was found at $2\theta = 32.9°$.

Catalyst-preparatory Example 4 (Preparation of solid titanium trichloride-based catalytic complex)

(A) Preparation of homogeneous titanium trichloride solution 2.5 m moles of titanium tetraiodide and 34.5 m moles of titanium tetrachloride were charged into a 500 ml four necked flask the atmosphere of which had been replaced by dry nitrogen. The molar ratio of titanium tetraiodide to titanium tetrachloride was 0.07:1. Then, 60 ml of purified toluene was introduced into the mixture, followed by treatment at 100° C. for 2 hours under agitation and cooling. When the inner temperature was lowered to 25° C., 37 m moles of di-n-butyl ether was added under agitation. Ten minutes after the addition, 18.5 m moles of diethylaluminium monochloride was gradually added to give a homogeneous dark brown solution.

(B) Formation of precipitate of titanium trichloride and preparation of catalyst When the homogeneous titanium trichloride solution obtained in the above step (A) was heated to 95° C., it was recognized that a purple precipitate of titanium trichloride was formed during heating. After agitation at 95° C. for 30 minutes, the precipitate was separated by filtration and washed with 100 ml of toluene once and then 100 ml of n-heptane four times to obtain a fine particulate, purple titanium trichloride-based catalytic complex. When analyzed, the precipitate was found to contain 0.01 gram atoms of Al and 0.11 moles of di-n-butyl ether per gram atom of Ti.

Catalyst-preparatory Example 5 (Preparation of solid titanium trichloride-based catalytic complex)

The procedure of the step (A) of Catalyst-preparatory Example 1 was repeated except that 90 m moles of di-n-butyl thioether was used instead of 77 m moles of di-n-butyl ether, thereby obtaining a homogeneous titanium trichloride solution. This solution was then treated in the same manner as in the step (B) of the Catalyst-preparatory Example 1 to obtain a fine particulate purple titanium trichloride-based catalytic complex.

When analyzed, the complex was found to contain 0.006 gram atoms of Al and 0.05 moles of di-n-butyl thioether per gram atom of Ti.

EXAMPLES 1–5 AND COMPARATIVE EXAMPLES 1–2

The polymerization of propylene was conducted in high catalytic efficiency in an induction-agitated, 3l autoclave by the use of the solid titanium trichloride-based catalytic complex obtained in the Catalyst-preparatory Example 1 as follows. The various types of cocatalysts obtained in the Cocatalyst-preparatory Example 1 were each charged into an autoclave which had been sufficiently dried under vacuum, and flushed with nitrogen.

Then, 0.6 kg/cm² of hydrogen gas was fed into the autoclave and 800 g of liquefied propylene was passed thereinto, followed by heating the autoclave. When the inner temperature of the autoclave reached 75° C., a n-hexane slurry containing the solid titanium trichloride-based catalytic complex obtained in the Catalyst-preparatory Example 1 was forced into the system by entrainment with a pressurized nitrogen gas while agitating. The time at which the complex disappeared was regarded as the start of the polymerization reaction. The polymerization reaction was continued at 75° C. for 5 hours under agitation. After completion of the polymerization, an excess of propylene was expelled to obtain white powdery polypropylene. The polymerization conditions and results are shown in Table 4.

COMPARATIVE EXAMPLES 3–6

Various types of the cocatalysts obtained in the Cocatalyst-preparatory Example 3 were each charged into a 3l autoclave which had been sufficiently dried under vacuum and substituted with nitrogen.

0.6 kg/cm² of hydrogen gas first fed into the autoclave and then 800 g of liquefied propylene was fed thereinto, followed by heating the autoclave. When the inner temperature of the autoclave reached 75° C., an n-hexane slurry containing the solid titanium trichloride-based catalytic complex obtained in the Catalyst-preparatory Example 1 was forced into the system by entrainment with a pressurized nitrogen gas while agitating. The time at which the complex disappeared was regarded as the start of the polymerization reaction. The reaction was continued while agitating at 75° C. for 5 hours. After completion of the polymerization, excess propylene was expelled to obtain white powdery polypropylene. The polymerization conditions and test results are shown in Table 5.

TABLE 4

| | amount of titanium trichloride in solid titanium trichloride-based Catalytic complex mg | cocatalyst $Al(n-C_3H_7)_nCl_{3-n}$ | | yield of polypropylene g | C.E. | K | I.I. % | $\rho_B$ g/cc | M.F.I. g/10 min. |
|---|---|---|---|---|---|---|---|---|---|
| | | value of n | amount m mole | | | | | | |
| Example 1 | 18.5 | 1.95 | 2.0 | 390 | 21100 | 126 | 95.7 | 0.35 | 3.6 |
| Example 2 | 18.7 | 2.03 | " | 441 | 23600 | 141 | 94.1 | 0.34 | 5.3 |
| Example 3 | 21.5 | 2.05 | " | 535 | 24900 | 149 | 94.2 | 0.33 | 3.2 |
| Example 4 | 20.5 | 2.10 | " | 494 | 24100 | 144 | 93.8 | 0.34 | 2.5 |
| Example 5 | 18.3 | 2.00 | " | 399 | 21800 | 130 | 94.7 | 0.34 | 5.1 |
| Comparative Example 1 | 20.5 | 1.91 | " | 269 | 13100 | 78 | 95.6 | 0.35 | 4.7 |

TABLE 4-continued

|  | amount of titanium trichloride in solid titanium trichloride-based Catalytic complex mg | cocatalyst Al(n-C₃H₇)ₙCl₃₋ₙ value of n | amount m mole | yield of polypropylene g | C.E. | K | I.I. % | ρ_B g/cc | M.F.I. g/10 min. |
|---|---|---|---|---|---|---|---|---|---|
| Comparative Example 2 | 16.5 | 2.15 | " | 401 | 24300 | 145 | 90.8 | 0.34 | 1.8 |

TABLE 5

|  | amount of titanium trichloride in solid titanium trichloride-based catalytic complex mg | cocatalyst Al(C₂H₅)ₙCl₃₋ₙ value of n | amount m mole | yield of polypropylene g | C.E. | K | I.I. % | ρ_B g/cc | M.I.F. g/10 min. |
|---|---|---|---|---|---|---|---|---|---|
| Comparative Example 3 | 23.5 | 1.95 | 2.0 | 317 | 13500 | 81 | 92.1 | 0.33 | 2.6 |
| Comparative Example 4 | 20.9 | 2.00 | " | 353 | 16900 | 101 | 92.3 | 0.33 | 2.5 |
| Comparative Example 5 | 15.3 | 2.05 | " | 295 | 19300 | 115 | 83.1 | 0.29 | 4.5 |
| Comparative Example 6 | 24.5 | 2.10 | " | 470 | 19200 | 115 | 80.2 | 0.26 | 3.1 |

EXAMPLES 6-8 AND COMPARATIVE EXAMPLES 7-8

Various types of the cocatalysts obtained in Cocatalyst-preparatory Example 2 were each charged into a 3l autoclave which had been sufficiently dried under vacuum and flushed with nitrogen.

Thereafter, 0.6 kg/cm² of hydrogen and then 800 g of liquefied propylene were charged into the autoclave, followed by heating the autoclave. When the inner temperature of the autoclave reached 75° C., an n-hexane slurry containing the solid titanium trichloride-based catalytic complex obtained in Catalyst-preparatory Example 1 was forcibly carried into the system by entrainment with pressurized nitrogen gas while agitating. The time at which the complex was completely discharged into the autoclave was regarded as the start of polymerization. The polymerization reaction was continued while agitating at 75° C. for 5 hours. After completion of the polymerization, excess of propylene was expelled to obtain white powdery polypropylene. The polymerization conditions and test results are shown in Table 6.

EXAMPLES 9-11

The polymerization of propylene was conducted with high catalytic efficiency in an induction-agitated, 3l autoclave using the solid titanium trichloride-based catalytic complex obtained in the Catalyst-preparatory Example 2 as follows.

Various types of the cocatalysts obtained in the Cocatalyst-preparatory Example 1 were each charged into an autoclave which had been sufficiently dried under vacuum and flushed with nitrogen.

Thereafter, 0.6 kg/cm² of hydrogen gas and then 800 g of liquefied propylene were charged, followed by heating the autoclave. When the inner temperature of the autoclave reached 75° C., an n-hexane slurry containing the solid titanium trichloride-based catalytic complex obtained in the Catalyst-preparatory Example 2 was forced into the autoclave by entrainment with pressurized nitrogen gas under agitation. The time at which the complex was completely discharged into the autoclave was regarded as the start of polymerization. The polymerization reaction was continued while agitating at 75° C. for 5 hours. After completion of the polymerization, excess propylene was expelled to obtain white powdery polypropylene. The polymerization conditions and test results are shown in Table 7.

TABLE 6

|  | amount of titanium trichloride in solid titanium trichloride-based catalytic complex mg | cocatalyst Al(n-C₆H₁₃)ₙCl₃₋ₙ value of n | amount m mole | yield of polypropylene g | C.E. | K | I.I. % | ρ_B g/cc | M.F.I. g/10 min. |
|---|---|---|---|---|---|---|---|---|---|
| Example 6 | 21.5 | 1.95 | 2.0 | 501 | 23300 | 139 | 95.3 | 0.33 | 3.1 |
| Example 7 | 19.5 | 2.05 | " | 515 | 26400 | 158 | 92.2 | 0.34 | 5.2 |
| Example 8 | 20.8 | 2.00 | " | 491 | 23600 | 141 | 94.1 | 0.34 | 2.4 |
| Comparative Example 7 | 23.5 | 1.90 | " | 343 | 14600 | 87 | 95.2 | 0.33 | 4.4 |
| Comparative Example 8 | 16.7 | 2.15 | " | 412 | 24700 | 147 | 90.0 | 0.34 | 3.2 |

TABLE 7

| | amount of titanium trichloride in solid titanium trichloride-based catalytic complex mg | cocatalyst Al(n-C$_3$H$_7$)$_n$Cl$_{3-n}$ | | yield of polypropylene g | C.E. | K | I.I. % | $\rho_B$ g/cc | M.F.I. g/10 min. |
|---|---|---|---|---|---|---|---|---|---|
| | | value of n | amount m mole | | | | | | |
| Example 9 | 27.8 | 1.95 | 2.0 | 456 | 16400 | 98 | 94.5 | 0.47 | 5.2 |
| Example 10 | 28.1 | 2.05 | " | 570 | 20300 | 121 | 93.1 | 0.46 | 1.7 |
| Example 11 | 24.5 | 2.00 | " | 439 | 17900 | 107 | 93.8 | 0.47 | 3.3 |

EXAMPLES 12-14

The polymerization of propylene was conducted in high catalytic efficiency in an induction-agitated, 3l autoclave using the solid titanium trichloride-based catalytic complex obtained in Catalyst-preparatory Example 3 as follows.

First, various types of the cocatalysts obtained in Cocatalyst-preparatory Example 1 were each charged into an autoclave which had been sufficiently dried under vacuum and flushed with nitrogen.

Then, 0.6 kg/cm$^2$ of hydrogen gas and then 800 g of liquefied propylene were charged, followed by heating the autoclave. When the inner temperature of the autoclave reached 75° C., an n-hexane slurry containing the solid titanium trichloride-based catalytic complex obtained in Catalyst-Preparatory Example 3 was forced into the system by entrainment with pressurized nitrogen gas under agitation. This time was regarded as the start of polymerization. The polymerization reaction was continued while agitating at 75° C. for 5 hours. After completion of the polymerization, excess propylene was expelled to obtain white powdery polypropylene. The polymerization conditions and test results are shown in Table 8.

EXAMPLES 15-17

Various types of the cocatalysts obtained in Cocatalyst-preparatory Example 1 and various types of the third components indicated in Table 9 were, respectively, charged into a 3l autoclave which had been sufficiently dried under vacuum and flushed with nitrogen.

There were charged 0.6 kg/cm$^2$ of hydrogen gas and then 800 g of liquefied propylene, followed by heating the autoclave. When the inner temperature of the autoclave reached 75° C., an n-hexane slurry containing the solid titanium trichloride-based catalytic complex obtained in Catalyst-preparatory Example 1 was forced into the system under agitation by entrainment with pressurized nitrogen gas. This point was regarded as the start of polymerization. The polymerization reaction was continued while agitating at 75° C. for 5 hours. After completion of the polymerization, excess propylene was expelled to give white powdery polypropylene. The polymerization conditions and test results are shown in Table 9.

TABLE 8

| | amount of titanium trichloride in solid titanium trichloride-based catalytic complex mg | cocatalyst Al(n-C$_3$H$_7$)$_n$Cl$_{3-n}$ | | yield of polypropylene g | C.E. | K | I.I. % | $\rho_B$ g/cc | M.F.I. g/10 min. |
|---|---|---|---|---|---|---|---|---|---|
| | | value of n | amount m mole | | | | | | |
| Example 12 | 30.8 | 1.95 | 2.0 | 465 | 15100 | 90 | 92.5 | 0.42 | 3.3 |
| Example 13 | 31.3 | 2.05 | " | 529 | 16900 | 101 | 89.1 | 0.37 | 5.7 |
| Example 14 | 29.7 | 2.00 | " | 463 | 15600 | 93 | 91.3 | 0.40 | 4.9 |

TABLE 9

| | amount of titanium trichloride in solid titanium trichloride-based catalytic complex mg | cocatalyst Al(n-C$_3$H$_7$)$_n$Cl$_{3-n}$ | | third component amount | yield of polypropylene g | C.F. | K | I.I. % | $\rho_B$ g/cc | M.F.I. g/10 min. |
|---|---|---|---|---|---|---|---|---|---|---|
| | | value of n | amount m mole | | | | | | | |
| Example 15 | 18.5 | 2.05 | 2.0 | ethyl benzoate 0.036 m moles | 435 | 23500 | 140 | 96.8 | 0.35 | 3.1 |
| Example 16 | 18.9 | " | " | phenyl acetate 0.018 m moles | 437 | 23100 | 138 | 97.4 | 0.34 | 1.6 |
| Example 17 | 21.3 | " | " | toluene 20 ml | 509 | 23900 | 143 | 97.2 | 0.35 | 2.3 |

EXAMPLES 18-22 AND COMPARATIVE EXAMPLES 9-10

Propylene was polymerized in the same manner as in Example 1 except that there were used the solid titanium trichloride-based catalytic complex obtained in Catalyst-preparatory Example 4 and various types of the cocatalysts obtained in Cocatalyst-preparatory Example 1. The polymerization conditions and test results are shown in Table 10.

TABLE 10

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | ρ$_B$ g/cc | M.F.I. g/10 min. |
|---|---|---|---|---|---|---|---|---|---|
| Example 18 | 15.3 | 1.95 | 2.0 | 360 | 23500 | 140 | 97.0 | 0.35 | 2.1 |
| Example 19 | 12.8 | 2.03 | " | 330 | 25800 | 154 | 96.1 | 0.34 | 3.9 |
| Example 20 | 14.9 | 2.05 | " | 387 | 26000 | 155 | 97.0 | 0.34 | 2.0 |
| Example 21 | 17.1 | 2.10 | " | 446 | 26100 | 156 | 95.7 | 0.34 | 8.5 |
| Example 22 | 15.6 | 2.00 | " | 368 | 23600 | 141 | 97.0 | 0.34 | 8.2 |
| Comparative Example 9 | 15.7 | 1.91 | " | 261 | 16600 | 99 | 96.8 | 0.34 | 7.3 |
| Comparative Example 10 | 13.9 | 2.15 | " | 377 | 27100 | 162 | 93.5 | 0.34 | 14.1 |

EXAMPLES 23-26

Propylene was polymerized in the same manner as in Example 1 except that there were used the solid titanium trichloride-based catalytic complex obtained in Catalyst-preparatory Example 5 and various types of the cocatalysts obtained in Cocatalyst-preparatory Example 1. The polymerization conditions and test results are shown in Table 11.

TABLE 11

| | amount of titanium trichloride in solid titanium trichloride-based catalytic complex mg | cocatalyst Al(n-C$_3$H$_7$)$_n$Cl$_{3-n}$ value of n | amount m mole | yield of polypropylene g | C.E. | K | I.I. % | ρ$_B$ g/cc | M.F.I. g/10 min. |
|---|---|---|---|---|---|---|---|---|---|
| Example 23 | 25.1 | 1.95 | 2.0 | 422 | 16800 | 100 | 95.6 | 0.31 | 8.8 |
| Example 24 | 23.4 | 2.05 | " | 365 | 15600 | 93 | 95.0 | 0.30 | 1.3 |
| Example 25 | 20.2 | 2.10 | " | 380 | 18800 | 112 | 92.6 | 0.30 | 5.1 |
| Example 26 | 18.5 | 2.00 | " | 303 | 16400 | 98 | 94.3 | 0.30 | 4.5 |

Catalyst-preparatory Example 6 (Preparation of solid titanium trichloride-based catalytic complex)

(A) Preparation of homogeneous titanium trichloride solution

There were charged 150 ml of purified toluene and 90 m moles of titanium tetrachloride into a 500 ml four necked flask which had been dried and flushed with dry argon, followed by adding 68 m moles of di-n-butyl ether. The titanium tetrachloride and the di-n-butyl ether were reacted with each other with a slight generation of heat and uniformly dissolved in toluene to give a homogeneous orange yellow solution. To the solution was gradually added a solution of 45 m moles of diethylaluminium monochloride in 20 ml of toluene while the solution was kept at 25° C. under agitation thereby obtaining a uniform dark orange solution of titanium trichloride.

(B) Formation of precipitate of titanium trichloride and preparation of catalyst When the homogeneous titanium trichloride solution obtained in the above step (A) was heated up to 95° C., it was recognized that a purple titanium trichloride precipitate was formed during the heating. After agitation at 95° C. for 60 minutes, the precipitate was separated by filtration and washed with 100 ml of n-heptane five times to obtain a fine particulate purple titanium trichloride-base catalytic complex. When subjected to an elementary analysis, it was found that the catalytic complex had a composition of the formula, TiCl$_3$(AlCl$_3$)$_{0.004}$[(n-C$_4$H$_9$)$_2$O]$_{0.05}$.

When the X-ray diffraction spectra of the complex were measured by the use of a CuKα ray, a halo of a maximum intensity was found to be at 2θ=32.9°.

EXAMPLE 27

The polymerization of propylene was conducted, as follows, in high catalytic efficiency in an induction-agitated, 3 l autoclave using the solid titanium trichloride-based catalytic complex obtained in Catalyst-preparatory Example 6. There were introduced the solid titanium trichloride-based catalytic complex obtained in Catalyst-preparatory Example 6 in an amount of 20.0 mg calculated as titanium trichloride and 1.3 ml of an n-hexane solution of di-n-propylaluminium monochloride with a concentration of 0.5 m moles/ml into the autoclave which had been sufficiently dried under vacuum and flushed with nitrogen. 0.6 kg/cm$^2$ of hydrogen gas was charged into the autoclave and 800 g of liquefied propylene was further charged, followed by polymerization at 70° C. for 3 hours. After completion of the polymerization, excess propylene was expelled to obtain 473 g of white powdery polypropylene. The catalytic effieicney, C.E. was found to be 23650, and the polymerization activity, K, was 263, and the polymer was found to have a bulk density of 0.39 g/cc, an I.I. value of 94.9% and an M.F.I. value of 2.6.

COMPARATIVE EXAMPLES 11-14

Example 27 was repeated using, instead of di-n-propylaluminium monochloride, di-n-butylaluminium monochloride, di-i-butylaluminium monochloride, diethylaluminium monochloride, or di-n-octylaluminium monochloride. The test results are shown in Table 12.

EXAMPLE 28

Example 27 was repeated using di-n-hexylaluminium monochloride instead of di-n-propylaluminium monochloride. The test results are shown in Table 12 together with those of Example 27 and Comparative Examples 11–14.

TABLE 12

| No. | type of organic aluminium compound | C.E. | K | bulk density g/cc | I.I. % | M.F.I. g/10 min. |
|---|---|---|---|---|---|---|
| Example 27 | di-n-propylaluminium monochloride | 23650 | 263 | 0.39 | 94.9 | 2.6 |
| Example 28 | di-n-hexylaluminium monochloride | 25270 | 281 | 0.39 | 94.8 | 1.3 |
| Comparative Example 11 | di-n-butylaluminium monochloride | 10350 | 115 | 0.39 | 90.2 | 3.5 |
| Comparative Example 12 | di-i-butylaluminium monochloride | 15740 | 175 | 0.39 | 94.1 | 2.1 |
| Comparative Example 13 | di-n-octylaluminium monochloride | 14350 | 159 | 0.34 | 76 | 1.6 |
| Comparative Example 14 | diethylaluminium monochloride | 18050 | 201 | 0.39 | 93.6 | 1.5 |

EXAMPLES 29–31 AND COMPARATIVE EXAMPLES 15–16

There was provided a 3 l, induction-agitated autoclave which had been sufficiently dried under vacuum and flushed with nitrogen, into which were charged the solid titanium trichloride-based catalytic complex, obtained in Catalyst-preparatory Example 6, in an amount of 20.0 g calculated as titanium trichloride, each of the organic aluminium compounds indicated in Table 13, and an electron-donor compound. There were charged 0.6 kg/cm$^2$ of hydrogen and then 800 g of liquefied propylene, followed by polymerization at 70° C. for 3 hours. The test results are shown in Table 13.

TABLE 13

| No. | type of organic aluminium compound | type and amount of electron-donor compound | C.E. | K | bulk density g/cc | I.I. % | M.F.I. g/10 min. |
|---|---|---|---|---|---|---|---|
| Example 29 | di-n-propylaluminium monochloride | phenylacetate 0.013 m moles | 23480 | 261 | 0.39 | 97.5 | 3.5 |
| Example 30 | di-n-propylaluminium monochloride | ethyl benzoate 0.013 m moles | 23520 | 261 | 0.39 | 97.1 | 1.8 |
| Example 31 | di-n-propylaluminium monochloride | triphenylphosphite 0.013 m moles | 22950 | 255 | 0.39 | 97.6 | 4.1 |
| Comparative Example 15 | diethylaluminium monochloride | phenyl acetate 0.013 m moles | 16080 | 179 | 0.39 | 96.1 | 3.2 |
| Comparative Example 16 | diethylaluminium monochloride | ethyl benzoate 0.013 m moles | 15400 | 171 | 0.39 | 96.0 | 2.9 |

Catalyst-preparatory Example 7 (Preparation of solid titanium trichloride-based catalytic complex)

(A) Preparation of homogeneous titanium trichloride solution

There were charged 125 ml of n-heptane and 100 m moles of titanium tetrachloride into a 500 ml four necked flask which had been sufficiently dried and flushed with dry argon, to which was added 150 m moles of di-n-dodecyl ether. The mixture was kept at 25° C. under agitation, into which was gradually dropped a solution of 50 m moles of triethylaluminium in 50 ml n-heptane thereby obtaining a homogeneous n-heptane solution of greenish dark brown titanium trichloride.

(B) Formation of precipitate of titanium trichloride and preparation of catalyst The homogeneous titanium trichloride solution obtained in the above step (A) was maintained at 60° C., to which was gradually added 100 m moles of titanium tetrachloride. Immediately after the addition, a purple precipitate of titanium trichloride was recognized to be formed. To complete the precipitate formation reaction, the system was kept at 60° C. for 20 minutes. Then, the precipitate of the titanium trichloride was separated by filtration and washed with 100 ml of n-hexane five times to obtain a purple solid titanium trichloride-based catalytic complex.

When analyzed by an elementary analysis, the catalytic complex was found to have a composition of the formula,

$TiCl_3(AlCl_3)_{0.005}[(n\text{-}C_{12}H_{25})_2O]_{0.11}$.

When the X-ray diffraction spectra of this complex were measured by the use of CuKα ray, it was found that a halo of a maximum intensity appeared at $2\theta = 32.9°$.

EXAMPLE 32

Into a 3l, induction-agitated autoclave which had been sufficiently dried, reduced to vacuum and flushed with nitrogen was charged the solid titanium trichloride-based catalytic complex, obtained in Catalyst-preparatory Example 7, in an amount of 20.0 mg calculated as titanium trichloride and 1.3 ml of an n-hexane solution of di-n-propylaluminium monochloride with a concentration of 0.5 m moles/ml. There were charged 0.6 kg/cm$^2$ of hydrogen gas and then 800 g of liquefied propylene, followed by polymerization at 70° C. for 3 hours. After completion of the polymerization, excess propylene was expelled to obtain 358 g of white powdery polypropylene. The test results are shown in Table 14.

COMPARATIVE EXAMPLE 17

The polymerization was conducted in the same manner as in Example 32 except that diethylaluminium monochloride was used instead of di-n-propylaluminium monochloride. The test results are shown in Table 14.

EXAMPLE 33

The polymerization was conducted in the same manner as in Example 32 except that di-n-hexylaluminium monochloride was used instead of di-n-propylaluminium monochloride, with the results shown in Table 14.

TABLE 14

| No. | type of organic aluminium compound | C.E. | K | bulk density g/cc | I.I. % | M.F.I. g/10 min. |
|---|---|---|---|---|---|---|
| Example 32 | di-n-propylaluminium monochloride | 17900 | 199 | 0.45 | 94.8 | 3.1 |
| Example 33 | di-n-hexylaluminium monochloride | 18350 | 204 | 0.43 | 93.9 | 1.8 |
| Comparative Example 17 | diethylaluminium monochloride | 13300 | 148 | 0.44 | 93.8 | 2.7 |

EXAMPLE 34

There were charged the solid titanium trichloride-based catalytic complex, obtained in Catalyst-preparatory Example 3, in an amount of 20.0 mg calculated as titanium trichloride and 1.3 ml of a n-hexane solution containing 0.5 m moles/ml of di-n-propylaluminium monochloride into a 3l, induction-agitated autoclave which had been sufficiently dried, reduced to vacuum and flushed with hydrogen. Thereafter, 0.6 kg/cm$^2$ of hydrogen gas and 800 g of liquefied propylene were successively charged into the system, followed by polymerization at 70° C. for 3 hours. After completion of the polymerization, excess propylene was expelled to obtain 302 g of white powdery polypropylene.

In the above case, the catalytic efficiency, C.E., was found to be 15,100 and the polymerization activity, K, was 168. The polymer was found to have a bulk density of 0.41 g/cc, and I.I. of 91.5% and an M.F.I. of 2.7.

COMPARATIVE EXAMPLE 18

The polymerization was conducted in the same manner as in Example 34 using diethylaluminium monochloride instead of di-n-propylaluminium monochloride, thereby obtaining 252 g of polypropylene. In this case, the C.E. was found to be 12600 and the K was 140. The polymer had a bulk density of 0.40 g/cc, an I.I. of 90.5% and an M.F.I. of 3.5 g/10 min.

COMPARATIVE EXAMPLE 19

The polymerization was conducted in the same manner as in Example 27 using 100 mg of commercially available titanium trichloride, TiCl$_3$(AlCl$_3$)$_{0.33}$, produced by Stawfer Co., Ltd., instead of the solid titanium trichloride-based catalytic complex obtained in Catalyst-preparatory Example 6.

The C.E. and K were found to be 2268 and 25, respectively, and the polymer had a bulk density of 0.38 g/cc, an I.I. of 88.7% and an M.F.I. of 4.5 g/10 min.

What is claimed is:

1. A process for polymerizing propylene, which comprises polymerizing propylene in the presence of a catalyst system composed of:
   (A) a solid titanium trichloride-based complex which is a fine particulate solid obtained by precipitation at a temperature below 150° C. from a liquid medium by reducing titanium tetrachloride with an organic aluminum compound in an ether or a thioether and which is expressed by the formula: TiCl$_3$.(AlR$_p^3$X$_{3-p}$)$_x$.(C)$_y$, wherein R$^3$ is a hydrocarbon group of 1-20 carbon atoms, X is a halogen atom, p is a value within the range of $0 \leq p \leq 2$, C is an ether or a thioether, x is a value less than 0.15 and y is a value greater than 0.001;
   (B) an organic aluminum cocatalyst of the formula: AlR$_n^1$Cl$_{3-n}$, wherein R$^1$ is a n-propyl group or a n-hexyl group and n is a value of 1.95–2.10; and
   (C) an electron donor compound.

2. A process for polymerizing propylene, which comprises polymerizing propylene in the presence of the catalyst system composed of:
   (A) a solid titanium trichloride-based complex which is a fine particulate solid obtained by precipitation at a temperature below 150° C. from a liquid medium by reducing a mixture of titanium tetrachloride and titanium tetraiodide in a molar ratio of titanium tetraiodide to titanium tetrachloride of 0.005–0.3:1 with an organic aluminum compound in an ether or a thioether and which is expressed by the formula: TiCl$_3$.(AlR$_p^3$X$_{3-p}$)$_x$.(C)$_y$, wherein R$^3$ is a hydrocarbon group of 1-20 carbon atoms, X is a halogen atom, p is a value within the range of $0 \leq p \leq 2$, C is an ether or a thioether, x is a value less than 0.15 and y is a value greater than 0.001; and
   (B) an organic aluminum cocatalyst of the formula: AlR$_n^1$Cl$_{3-n}$, wherein R$^1$ is a n-propyl group or a n-hexyl group and n is a value of 1.95–2.10.

3. A process for polymerizing propylene, which comprises: polymerizing propylene in the presence of the catalyst system composed of:
   (A) a solid titanium trichloride-based complex which is a fine particulate solid obtained by precipitation at a temperature below 150° C. from a liquid medium by reducing a mixture of titanium tetrachloride and titanium tetraiodide in a molar ratio of titanium tetraoidide to titanium tetrachloride of 0.005–0.3:1 with an organic aluminum compound in an ether or a thioether and which is expressed by the formula: TiCl$_3$.(AlR$_p^3$X$_{3-p}$)$_x$.(C)$_y$, wherein R$^3$ is a hydrocarbon group of 1-20 carbon atoms, X is a halogen atom, p is a value within the range of $0 \leq p \leq 2$, C is an ether or a thioether, x is a value less than 0.15 and y is a value greater than 0.001;
   (B) an organic aluminum cocatalyst of the formula: AlR$_n^1$Cl$_{3-n}$, wherein R$^1$ is a n-propyl group or a n-hexyl group and n is a value of 1.95–2.10; and
   (C) an electron donor compound.

4. A process for polymerizing propylene, which comprises polymerizing propylene in the presence of a catalyst system composed of:
   (A) a solid titanium trichloride-based complex which is a fine particulate solid obtained by precipitation at a temperature below 150° C. from a liquid medium by reducing titanium tetrachloride with an organic aluminum compound in an ether or a thioether and which is expressed by the formula: $TiCl_3 \cdot (AlR^3pX_{3-p})_x \cdot (C)_y$, wherein $R^3$ is a hydrocarbon group of 1–20 carbon atoms, X is a halogen atom, p is a value within the range of $0 \leq p \leq 2$, C is an ether or a thioether, x is a value less than 0.15 and y is a value greater than 0.001; and (B) an organic aluminum cocatalyst of the formula: $AlR^1{}_nCl_{3-n}$, wherein $R^1$ is a n-propyl group or a n-hexyl group and n is a value of 1.95–2.10.

5. The process according to claim 1, 2, 3 or 4, wherein said organic aluminum compound is the reaction product of tri-n-propyl-aluminum or tri-n-hexylaluminum and aluminum trichloride.

6. The process according to claim 1, 2, 3 or 4, wherein said organic aluminum compound is the reaction product of (a) tri-n-propyl-aluminum, tri-n-hexylaluminum or aluminum trichloride and (b) a compound of the formula, $AlR_m{}^2Cl_{3-m}$ wherein $R^2$ represents a n-propyl group or a n-hexyl group, and m is a value within the range of $0 < m < 3$.

7. The process according to claim 1, 2, 3 or 4, wherein said organic aluminum compound is di-n-propylaluminum monochloride or di-n-hexylaluminum monochloride.

8. The process according to claim 1, 2, 3 or 4, wherein said solid titanium trichloride-based complex is one which exhibits, in its X-ray diffraction chart, a halo of maximum intensity at a position corresponding to the maximum peak of α-titanium trichloride.

9. The process according to claim 1, 2, 3 or 4, wherein propylene is random copolymerized or block copolymerized with a second α-olefin so that the propylene content in the product copolymer is greater than 80 wt.%.

10. The process according to claim 1, 2, 3 or 4, wherein the polymerization of propylene is conducted until polyproylene is produced in an amount of greater than 5000 grams per gram of the titanium trichloride component of said complex.

11. The process according to claim 10, wherein said polypropylene is produced in an amount of greater than 10,000 grams per gram of titanium trichloride of said complex.

12. The process according to claim 1, 2, 3 or 4, wherein said polymerization reaction is conducted at a temperature of 50°–100° C. under a pressure of atmospheric pressure to 100 atmospheres.

* * * * *

UNITED STATES PATENT AND TRADEMARK OFFICE
CERTIFICATE OF CORRECTION

PATENT NO. : 4,258,161
DATED : March 24, 1981
INVENTOR(S) : GENJIRO KAKOGAWA ET AL It is certified that error appears in the above-identified patent and that said Letters Patent is hereby corrected as shown below:

Column 2, line 26, delete "$\underline{a}$".

Column 2, line 27, after "component", insert --a--.

Column 6, line 10, delete "from" and insert --room--.

Column 6, lines 32 and 33, add commas as follows:

for example, ethers(,) polyethers, alkylene oxides,
    furan, amines(,) trialkylphosphines(,) triarylphosphines, Column 8, line 8, delete "$\underline{\pi_B}$" and insert therefor --$\rho_B$--.

UNITED STATES PATENT AND TRADEMARK OFFICE
CERTIFICATE OF CORRECTION

PATENT NO. : 4,258,161

DATED : March 24, 1981

INVENTOR(S) : GENJIRO KAKOGAWA ET AL

It is certified that error appears in the above-identified patent and that said Letters Patent is hereby corrected as shown below:

Column 12, lines 27 and 48, delete "disappeared" and insert therefor:

--was completely fed thereinto--

Column 21, line 54, delete "Stawfer Co., Ltd." and insert therefor:

--Stauffer Chemical Co.--

Signed and Sealed this

Twenty-fifth Day of January 1983

[SEAL]

Attest:

GERALD J. MOSSINGHOFF

Attesting Officer     Commissioner of Patents and Trademarks